United States Patent
Tanigaki

[19]

[11] Patent Number: 5,967,900
[45] Date of Patent: Oct. 19, 1999

[54] CROSS-GROVE TYPE CONSTANT VELOCITY JOINT

[75] Inventor: Yutaka Tanigaki, Iwata, Japan

[73] Assignee: NTN Corporation, Osaka, Japan

[21] Appl. No.: 08/991,006

[22] Filed: Dec. 15, 1997

[30]  Foreign Application Priority Data

Dec. 27, 1996  [JP]  Japan ................................... 8-350268

[51] Int. Cl.[6] .................................................. F16D 3/22
[52] U.S. Cl. .......................................... 464/144; 464/906
[58] Field of Search .................................. 464/144, 145, 464/906

[56]  References Cited

U.S. PATENT DOCUMENTS

| | | | |
|---|---|---|---|
| 3,107,504 | 10/1963 | Koss | 464/906 |
| 3,133,431 | 5/1964 | Zech | 464/144 |
| 3,908,400 | 9/1975 | Takahashi et al. | 464/144 |
| 4,319,465 | 3/1982 | Ito et al. | 464/145 |
| 5,186,687 | 2/1993 | Hayashi et al. | 464/144 |
| 5,788,578 | 8/1998 | Shimizu et al. | 464/145 |
| 5,813,917 | 9/1998 | Wakamatsu et al. | 464/144 |

FOREIGN PATENT DOCUMENTS

88/09445  12/1988  WIPO .................................... 464/906

Primary Examiner—Eileen D. Lillis
Attorney, Agent, or Firm—Nikaido, Marmelstein, Murray & Oram LLP

[57]  ABSTRACT

Relief portions $1c1$, $1c2$ are formed at the boundary regions between the guide groove $1a$ and the inner peripheral surface $1b$, and are respectively positioned at the inner side and the inlet side taking a joint center position 0 as a reference. The relief portions $1c1$, $1c2$ are gradually increased toward the end portions of the guide groove $1a$. Groove depths ($\theta 1$, $\theta 2$) of the guide groove $1a$ at the left region and the right region are identical to each other in all cross-sections orthogonal to the groove bottom line L, and the groove depth is the largest ($\theta 2$) at the center region including the joint center position 0, and is gradually decreased from the center region toward the both ends. ($\theta 1$: $\theta 2 > \theta 1$).

2 Claims, 5 Drawing Sheets

CROSS-GROVE TYPE CONSTANT VELOCITY JOINT

BACKGROUND OF THE INVENTION

The present invention relates to a cross-groove type constant velocity joint used for propeller shaft or drive shaft of automobiles.

A cross-groove type constant velocity joint is such that each of guide groove of an outer joint member and each of guide groove of an inner joint member corresponding to each other are slewed in the circumferential direction opposite to each other, and a torque transmitting ball is retained and controlled in a track portion at which the both guide grooves are crossed, whereby since play between the torque transmitting balls and guide grooves can be decreased, the joint has widely been utilized for propeller shafts or drive shafts of automobiles where such play is not permitted.

FIGS. 4(*a*) and 4(*b*) illustrates an outer joint member 11 of a cross-groove type constant velocity joint. As shown in FIG. 4(*a*), guide grooves 11*a* slewed with a cross angle $\gamma$ in one circumferential direction with respect to an axial line X and guide grooves 11*a* slewed with a cross angle $\gamma$ in the other circumferential direction are alternately formed in an inner peripheral surface 11*b* of the outer joint member 11, FIG. 4(*b*) is a view showing the guide groove 11*a* when seeing the same from the inner diametrical side. A groove bottom line L is slewed with the cross angle $\gamma$ in the circumferential direction. Dotted lines at both side wall surfaces of the guide groove 11*a* are contacting lines C between a torque transmitting ball and the guide groove 11*a*. The left and right contacting lines C are parallel to the groove bottom line L and equidistant therefrom. However, boundary lines N between the guide groove 11*a* and the inner peripheral surface 11*b* are not parallel to the groove bottom line L but have an appointed inclination.

FIGS. 5A, 5B and 5C are cross-sectional views each taken along the lines A—A, B—B, and C—C of the guide groove 11*a* in FIG. 4(*b*). The A—A cross section shown in FIG. 5A is a cross section in the direction orthogonal to the groove bottom line L of the guide groove 11*a* at the inner side end, the C—C cross section shown in FIG. 5C is a cross section in the direction orthogonal to the groove bottom line L of the guide groove 11*a* at the front side end, and the B—B cross section shown in FIG. 5B is a cross section in the direction orthogonal to the groove bottom line L of the guide groove 11*a* at the joint center position 0. L' shows the perpendicular line connecting the ball center position 0' to the groove bottom line L, $\alpha$ shows the contacting angle, and X' shows the position of the axial line X. As shown in the same figure, although the groove depth (the length of an arc from the groove bottom line L to the boundary line N) of the guide groove 11*a* is identical between left side region and right side region at the joint center position 0 (B—B cross-section), the difference of the groove depth between left side region and right side region is gradually increased from the joint center position 0 toward the groove end side, wherein the difference is the maximum at the groove end (A—A cross section, C—C cross section). Such a construction necessarily results from the guide groove 11*a* having a cross angle $\gamma$ with respect to the axial line X, and the construction is inherent in cross-groove type constant velocity joints.

Generally, the guide groove 11*a* of the outer joint member 11 described above is formed by grinding, etc. after forging. Conventionally, in these production processes, the guide groove 11*a* has been worked so as to secure accuracy at all regions thereof.

Although the groove depth of the guide groove 11*a* of the outer joint member 11 is different between the left side region and the right side region at positions apart from the joint center position 0, when the guide groove 11*a* is given torque by the torque transmitting ball, it is the shallow side of the guide groove 11*a* that there is a fear of the torque transmitting ball coming off from the guide groove 11*a*, and the performance and durability of joints are determined by the groove depth at a shallow portion. Therefore, it is necessary to secure a groove depth required in view of design of joint at a shallow side, as a result, an outside region D of a deep side (see the A—A cross section and C—C cross section in FIGS. 5A and 5C) will become a region which does not have any relation to the performance and durability of joints.

However, in the conventional joint, machining to secure accuracy has been carried out even at the above mentioned region D which does not relate to the performance and durability of the joint. Such machining can be said to be a so-called excessive quality machining. Furthermore, a cycle time of machining is increased since the above mentioned region D is machined, thereby causing the productivity thereof to be decreased.

Therefore, in order to achieve the above mentioned problem, the present applicant previously proposed a construction in which the groove depth of the guide groove of the outer joint member is identical between the left side region and the right side region taking the groove bottom line of the guide groove as a reference, and is regular at all regions in the lengthwise direction along the groove bottom line of the guide groove (Japanese patent application no. 216725 of 1993).

However, when this kind of constant velocity joint transmits a rotational power while taking an operating angle, the load acting on the guide groove is not uniform on all regions in the lengthwise direction, but is the largest at the central region (normal use region) including the joint center position and becomes gradually decreased from the central region toward both ends. Therefore, with the construction already proposed (Japanese patent application no. 216725 of 1993), since the groove depth is regular at all regions in the lengthwise direction, there may be a fear that the load capacity of the central region (normal use region) will become insufficient, depending upon the use conditions.

SUMMARY OF THE INVENTION

It is therefore an object of the invention is to secure a load capacity in normal use region, whereby to maintain good durability while increasing the productivity in the production processes of cross-groove type constant velocity joints.

To achieve the above-mentioned object, the present invention provides a construction in which a groove depth of each of guide grooves of an outer joint member is identical between left side region and right side region in each of the cross-sections orthogonal to a groove bottom line thereof, and the groove depth is the largest at a central region including a joint center position and is gradually decreased toward both end sides from the central region.

According to the present invention, in comparison with the conventional joints shown in FIGS. 4(*a*), 4(*b*), 5A, 5B and 5C, the region for which the accuracy is to be secured is further decreased, and it becomes much easier to carry out the quality control. Furthermore, since the machining region is decreased, the cycle time of machining is decreased. Still furthermore, since the groove depth of the guide groove is deepest at the center region which becomes the normal use region, the durability can be secured as in the conventional joint shown in FIG. 4 and FIG. 5. (The durability is increased in comparison with the joint according to Japanese patent application no. 216725 of 1993 already filed).

PREFERRED EMBODIMENT OF THE INVENTION

Hereinafter, a description is given of a preferred embodiment of the invention.

Figure 1:
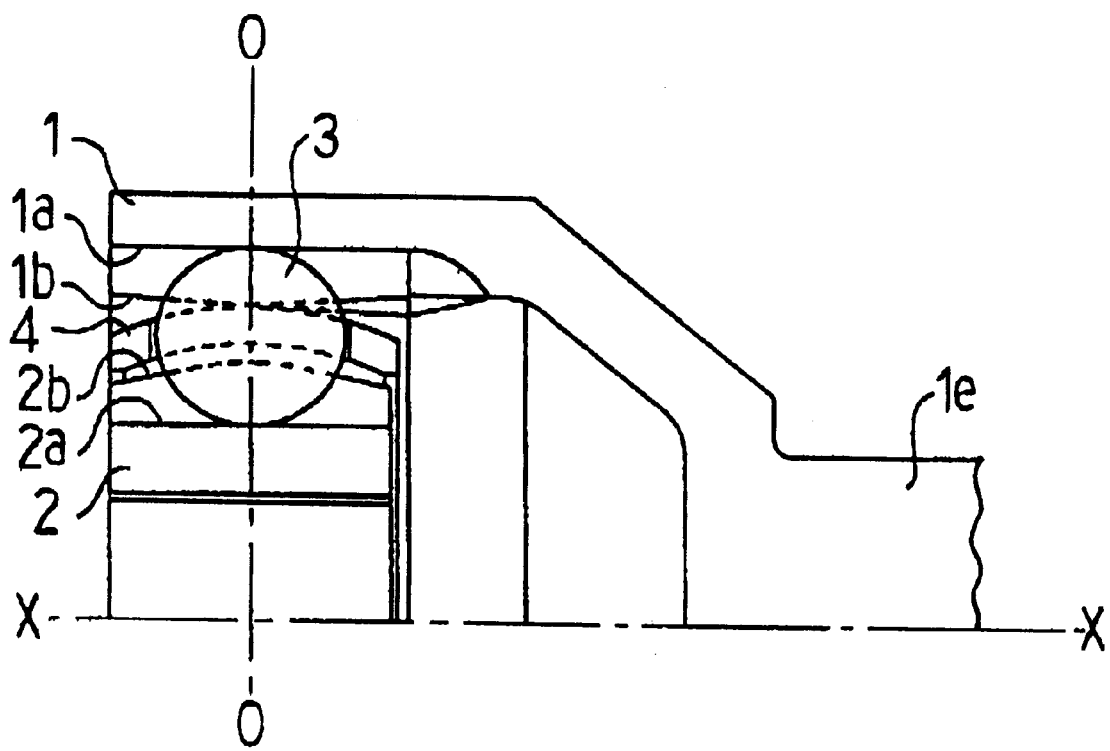
FIG. 1 is a cross-sectional view showing a cross-groove type constant velocity joint, FIG. 2 (a) is a perspective view showing an outer joint member.

FIG. 1 illustrates a cross-groove type constant velocity joint for a drive shaft of an automobile. This constant velocity joint comprises an outer joint member 1 provided with a plurality of guide grooves 1a at an inner peripheral surface 1b thereof, an inner joint member 2 provided with a plurality of guide grooves 2a at an outer peripheral surface 2b thereof, torque transmitting balls 3 disposed in ball tracks formed between the guide grooves 1a and the guide grooves 2a, and a cage 4 for retaining the torque transmitting balls 3.

Figure 2:
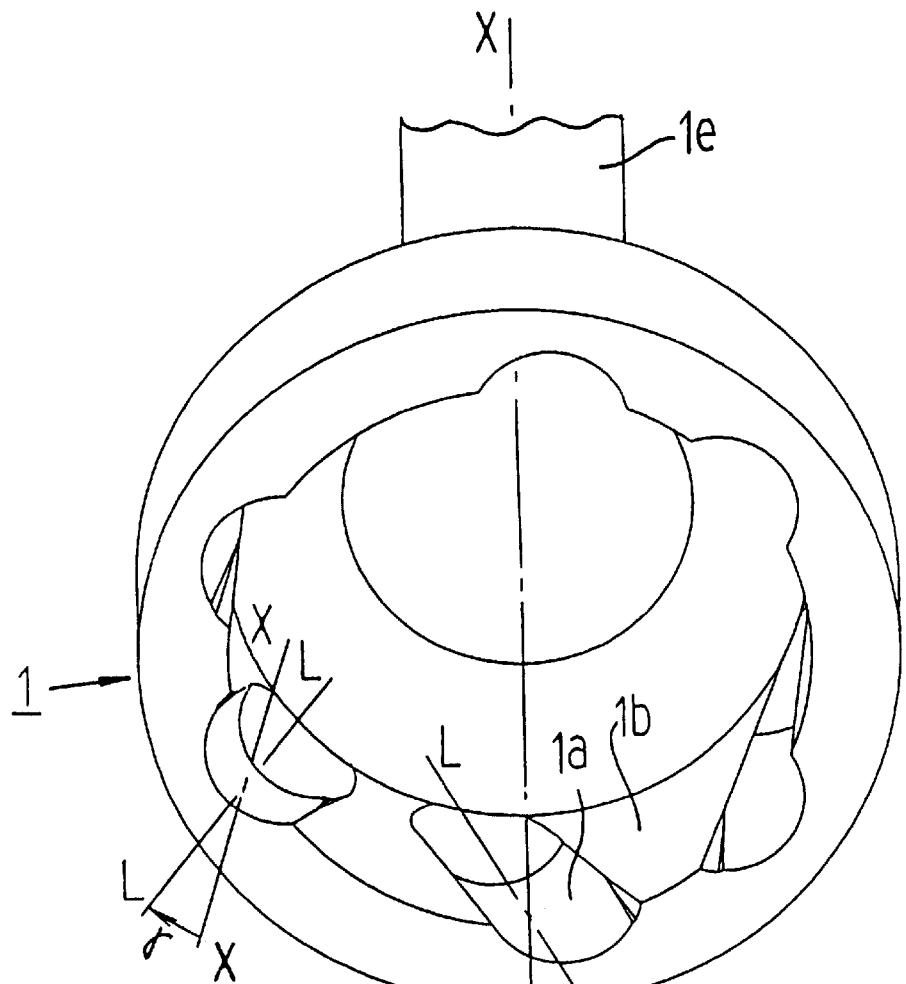
FIG. 2(b) is a view showing a guide groove observed from the inner diametrical side.
Figure 2:
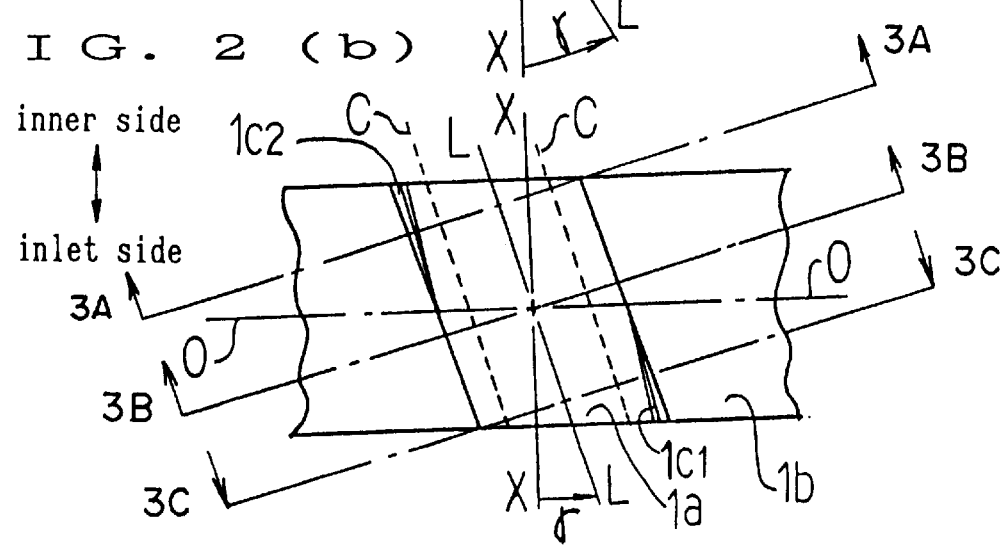

FIGS. 2(a) and 2(b) illustrate the outer joint member 1 of the above mentioned cross-groove type constant velocity joint. The outer joint member 1 is of cup-shaped having a stem 1e integral therewith. As shown in FIG. 2(a), guide grooves 1a slewed with a cross angle γ in one circumferential direction with respect to an axial line X and guide grooves 1a slewed with a cross angle γ in the other circumferential direction are alternately formed in the inner peripheral surface 1b of the outer joint member 1. FIG. 2(b) is a view showing a guide groove 1a observed from the inner diametrical side. A groove bottom line L of the guide groove 1a has a cross angle γ in the circumferential direction with respect to the axial line X. Dotted lines depicted at both the sides of the guide groove 1a are contacting lines C between the torque transmitting ball 3 and the guide groove 1a. The contacting lines C are parallel to the groove bottom line L and equidistant thereto.

Figure 3A:
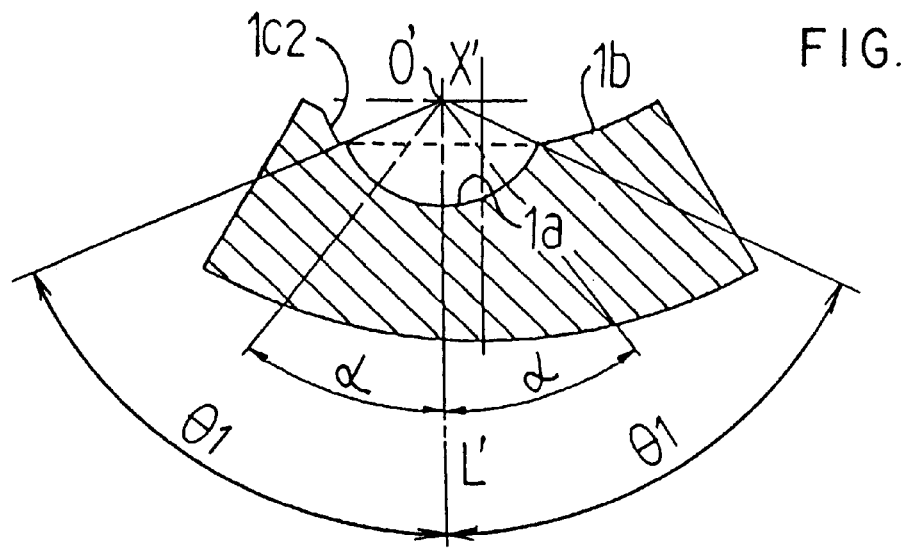
FIGS. 3A, 3B, and 3C are cross-sectional views of the guide groove respectively taken along the lines A—A, B—B and C—C in FIG. 2(b) respectively.
Figure 3B:
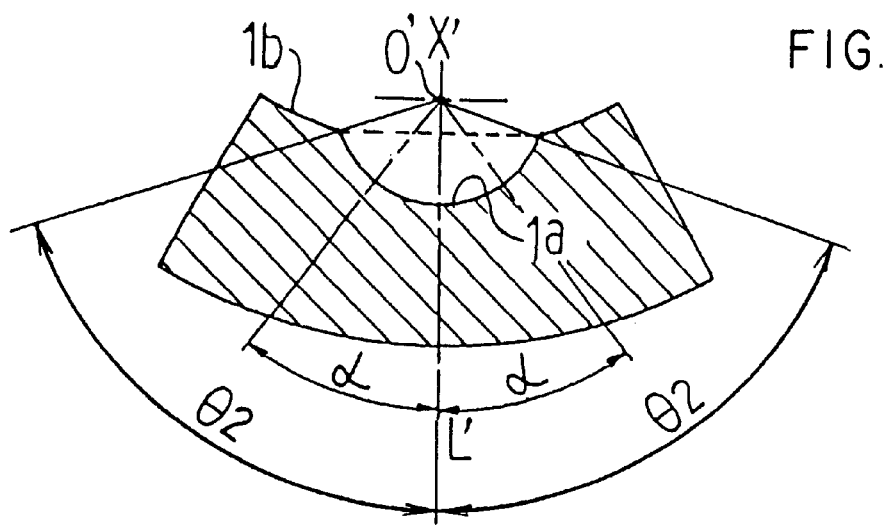
Figure 3C:
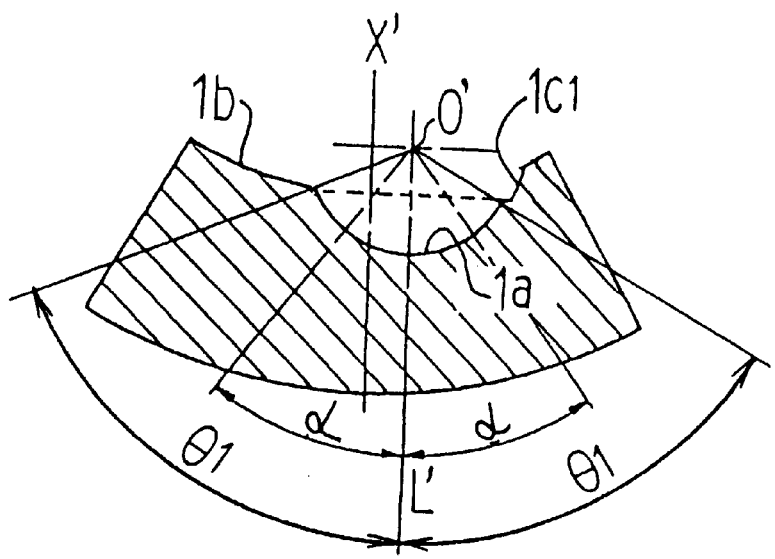
Figure 4:
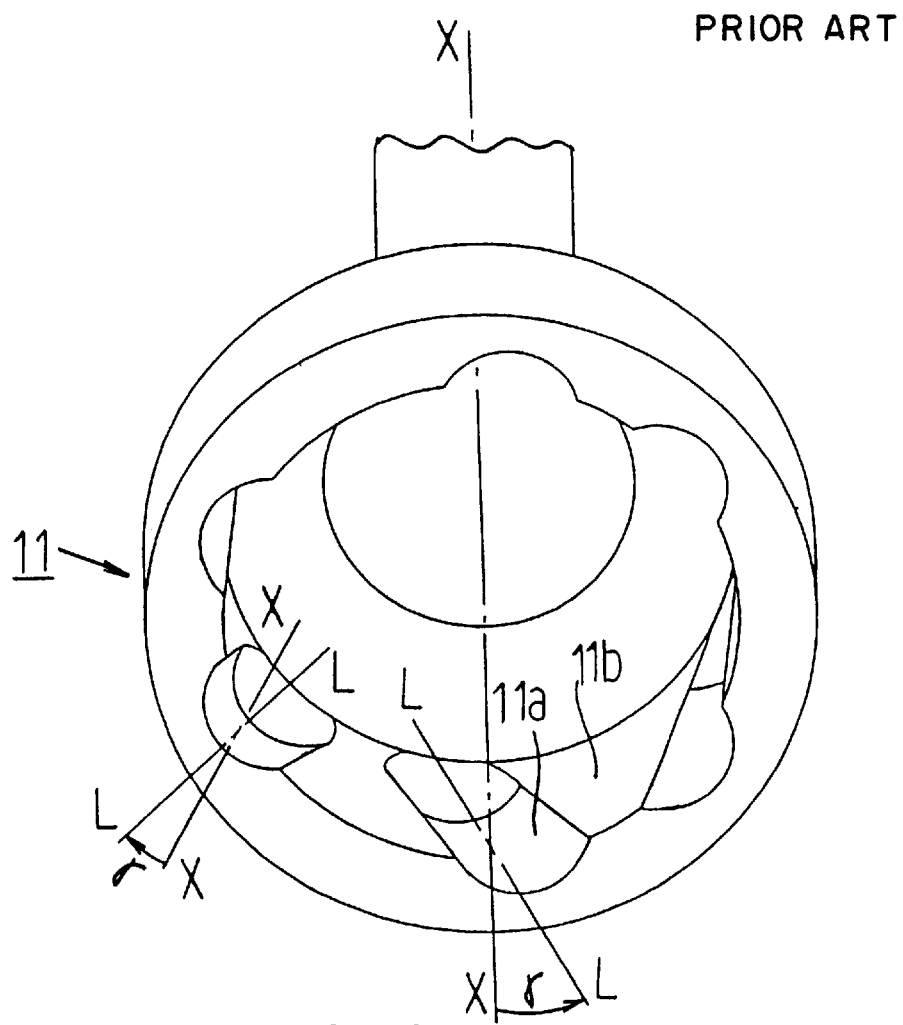
FIG. 4(a) is a perspective view showing an outer joint member of a conventional joint.
FIG. 4(b) is a view showing a guide groove observed from the inner diametrical side.
Figure 4:
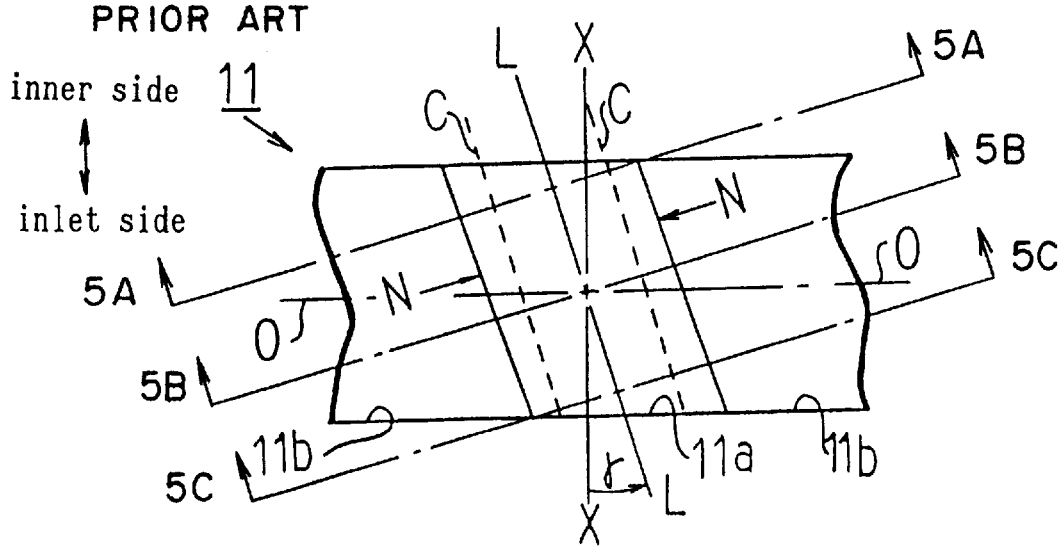

Relief portions 1c1, 1c2 are formed at the boundary regions between the guide groove 1a and the inner peripheral surface 1b, and are respectively positioned at the inner side and the inlet side taking a joint center position 0 as a reference. In the guide groove 1a having the cross angle γ in the direction shown in FIG. 2(b), the relief portion 1c1 is formed from the joint center position 0 to the inlet side end at the boundary region which is the right side in the same figure, and the relief portion 1c2 is formed from the joint center position 0 toward the inner side end at the boundary region which is the left side in the same figure. The relief portions 1c1, 1c2 are gradually increased toward the end portions of the guide groove 1a. Furthermore, in the guide groove 1a having the cross angle γ in the direction opposite to the direction shown in FIG. 2(b), the region where the relief portions 1c1, 1c2 are formed is left-right reversed, FIGS. 3A, 3B, and 3C are cross-sectional views taken along the line A—A, B—B, and C—C of the guide groove 1a in FIG. 2(b). The A—A cross-section is a cross section in the direction orthogonal to the groove bottom line L of the guide groove 1a at the inner side end, the C—C cross-section is a cross section in the direction orthogonal to the groove bottom line L of the guide groove 1 at the inlet side end, and the B—B cross-section is a cross-section in the direction orthogonal to the groove bottom line L of the guide groove 1a at the joint center position 0. L' is a perpendicular line connecting the ball center line 0' to the groove bottom line L, α is a contacting angle, and X' shows the position of the axial line X. As shown in the same figure, groove depths (θ1, θ2) of the guide groove 1a at the left region and the right region are identical to each other in all cross-sections orthogonal to the groove bottom line L, and the groove depth is the largest (θ2) at the center region including the joint center position 0, and is gradually decreased from the center region toward the both ends. (θ1:θ2>θ1).

Figure 5A:
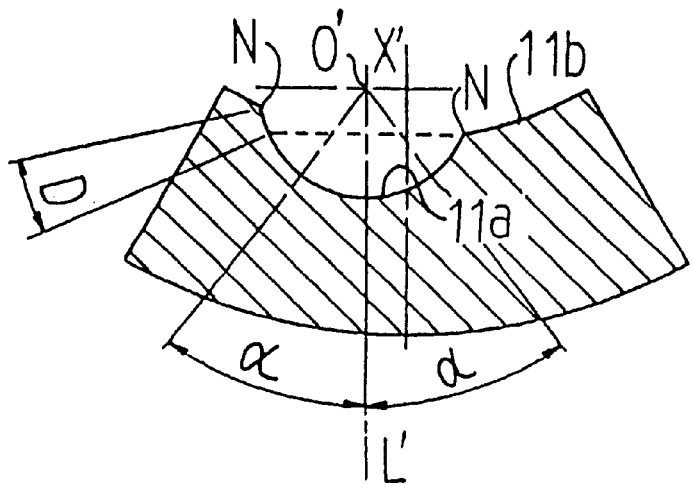
FIGS. 5A, 5B, and 5C are cross-sectional views of the guide groove respectively taken along the lines A—A, B—B and C—C in FIG. 4(b).
Figure 5B:
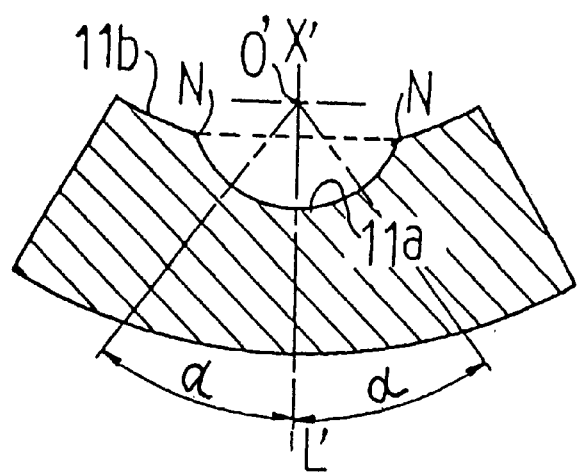
Figure 5C:
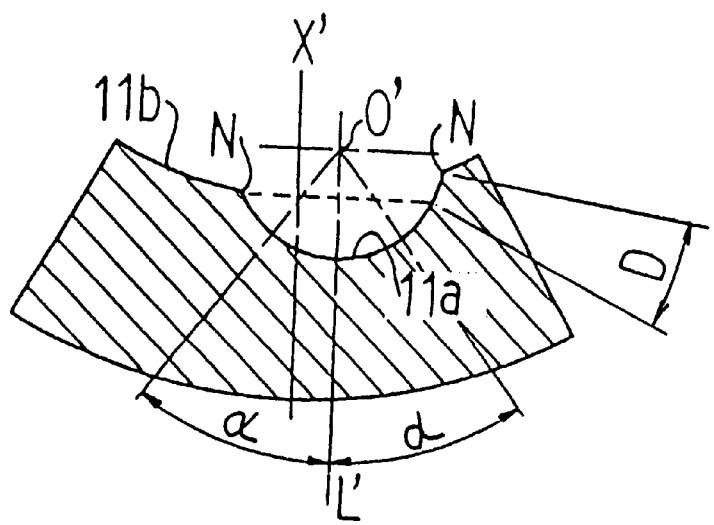

The depths (θ1, θ2) are determined in design by the use conditions of joint, load torque, etc. The relief portions 1c1, 1c2 are provided outside the groove depths (regions) (θ1, θ2) (that is, they correspond to the regions D shown in FIGS. 5A and 5C). Since the regions where the relief portions 1c1, 1c2 are provided is not in relation to the performance and durability of the joint, no worry arises about a lowering of the performance and durability of the joint even though relief portions 1c1, 1c2 are provided in these regions. Furthermore, since it is enough that accuracy of the guide groove 1a is secured at the groove depths (regions) (θ1, θ2), the region to be secured in accuracy is decreased in comparison with the conventional joint shown in FIGS. 4(a), 4(b), 5A 5B, and 5C. Still furthermore, when this kind of constant velocity joint transmits a rotational power while taking an operating angle, the center region including the joint center position 0 of the guide groove 1a becomes a normal use region, wherein the load becomes the largest in this region. Therefore, by the groove depth of the guide groove 1a being the largest at this center region, durability of the joint can be secured as in the conventional joint shown in FIGS. 4(a), 4(b), 5A, 5B, and 5C.

The relief portions 1c1, 1c2 described above may be formed simultaneously with the guide groove 1a when forging the outer joint member 1 or may be formed by carrying out another machining after forging. Various shapes of the relief portions 1c1, 1c2 may be available, such as a tapered shape, a shape having curvature, etc. in addition to a stepped shape shown in FIG. 2 and FIG. 3.

As described above, in the cross-groove type constant velocity joint, by securing the groove depths θ1, θ2 (θ2>θ1) of the guide groove 1a of the outer joint member being necessary in view of designing of joints, and making the regions outside this groove region be the relief portions 1c1, 1c2, it is possible to decrease the region for which the accuracy is to be secured, in the guide grooves 1a in comparison with the conventional joints shown in FIGS. 4(a), 4(b), 5A, 5B, and 5C, whereby it is possible to attempt to increase the productivity in the joint production process.

What is claimed is:

1. A cross-groove type constant velocity joint comprising:
    an outer joint member provided at an inner peripheral surface thereof with guide grooves slewed in one circumferential direction with respect to an axial line thereof and guide grooves slewed in the other circumferential direction alternately;

an inner joint member provided at an outer peripheral surface thereof with guide grooves, each of the guide grooves forming a ball track by cooperating with each of the guide grooves of the outer joint member corresponding thereto, each of the guide grooves slewed in the circumferential direction opposite to the corresponding guide groove of the outer joint member;

a torque transmitting ball disposed in each of the ball tracks;

and a cage for retaining the torque transmitting balls, wherein a groove depth of each of the guide grooves of the outer joint member is identical between left side region and right side region in each of the cross-sections orthogonal to a groove bottom line thereof, and the groove depth is the largest at a central region including a joint center position and is gradually decreased toward both end sides from the central region.

2. An outer joint member for a cross-groove type constant joint provided at an inner peripheral surface thereof with guide grooves slewed in one circumferential direction with respect to an axial line thereof and guide grooves slewed in the other circumferential direction alternately, wherein a groove depth of each of the guide grooves is identical between left side region and right side region in each of the cross-sections orthogonal to a groove bottom line thereof, and the groove depth is the largest at a central region including a joint center position and is gradually decreased toward both end sides from the central region.

* * * * *